United States Patent
Kitazawa et al.

(10) Patent No.: US 7,971,820 B2
(45) Date of Patent: Jul. 5, 2011

(54) WEBBING TAKE-UP DEVICE

(75) Inventors: Yasuho Kitazawa, Aichi-ken (JP);
Hitoshi Takamatsu, Aichi-ken (JP);
Masaki Yasuda, Aichi-ken (JP);
Kazuhiko Aihara, Aichi-ken (JP);
Toshio Nakashima, Aichi-ken (JP);
Tomonori Nagata, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 541 days.

(21) Appl. No.: 11/356,970

(22) Filed: Feb. 21, 2006

(65) Prior Publication Data

US 2006/0186252 A1  Aug. 24, 2006

(30) Foreign Application Priority Data

Feb. 21, 2005  (JP) .................. 2005-044384

(51) Int. Cl.
*B60R 22/28* (2006.01)
*B60R 22/405* (2006.01)
*B60R 22/46* (2006.01)

(52) U.S. Cl. .................. 242/379.1; 242/374; 242/383.4; 242/384.6

(58) Field of Classification Search .............. 242/374, 242/379.1, 382–384.7; 297/472, 476, 477, 297/478; 280/805, 806, 807
See application file for complete search history.

(56) References Cited

U.S. PATENT DOCUMENTS

| | | | | |
|---|---|---|---|---|
| 3,467,337 A | * | 9/1969 | Putman | 242/381.4 |
| 3,741,496 A | * | 6/1973 | Beller | 242/383.1 |
| 3,889,898 A | | 6/1975 | Ziv | |
| 3,901,460 A | | 8/1975 | Dully et al. | |
| 3,917,189 A | * | 11/1975 | Bryll | 242/383.1 |
| 3,958,773 A | | 5/1976 | Sugar | |
| 4,378,915 A | * | 4/1983 | Fohl | 242/381.4 |
| 4,391,420 A | | 7/1983 | Ahad et al. | |
| 4,619,419 A | * | 10/1986 | Essler | 242/376.1 |
| 4,645,138 A | * | 2/1987 | Kapanka | 242/383.4 |
| 5,495,994 A | * | 3/1996 | Rumpf et al. | 242/384.4 |
| 5,529,258 A | | 6/1996 | Dybro et al. | |
| 5,529,259 A | * | 6/1996 | Woydick et al. | 242/376 |
| 5,740,979 A | * | 4/1998 | Rohrle | 242/382 |

(Continued)

FOREIGN PATENT DOCUMENTS

JP   60-117242 U   8/1985

(Continued)

OTHER PUBLICATIONS

European Search Report dated May 31, 2006.

(Continued)

*Primary Examiner* — Michael R Mansen
*Assistant Examiner* — Scott Haugland
(74) *Attorney, Agent, or Firm* — Roberts Mlotkowski Safran & Cole P.C.

(57) ABSTRACT

A webbing take-up device comprising: a take-up shaft that takes up a webbing belt; a metal frame that axially supports the take-up shaft; and a lock mechanism comprising a lock plate that blocks rotation in the pullout direction of the webbing of the take-up shaft by engaging the take-up shaft directly or indirectly. The lock plate is formed by performing press-punch and press-bend processing on a metal plate and has a connecting portion formed so that one end side thereof is continuous with a lock, which engages the take-up shaft. The connecting portion spans between one side and the other side of the frame.

23 Claims, 5 Drawing Sheets

U.S. PATENT DOCUMENTS

| | | | | |
|---|---|---|---|---|
| 5,779,177 A * | 7/1998 | Kielwein | | 242/382.6 |
| 5,788,176 A * | 8/1998 | Ebner et al. | | 242/374 |
| 5,934,596 A * | 8/1999 | Gorman et al. | | 242/379.1 |
| 6,283,398 B1 * | 9/2001 | Specht | | 242/383.4 |
| 6,322,018 B1 * | 11/2001 | Smithson et al. | | 242/384 |
| 7,232,089 B2 * | 6/2007 | Inagawa et al. | | 242/379.1 |

FOREIGN PATENT DOCUMENTS

| | | | |
|---|---|---|---|
| JP | 61-56146 U | | 4/1986 |
| JP | 2002178877 A | * | 6/2002 |

OTHER PUBLICATIONS

Notice of Reasons for Rejection issued by Japanese Patent Office in corresponding Japanese Patent Application No. 2005-044384 mailed Dec. 1, 2009.

* cited by examiner

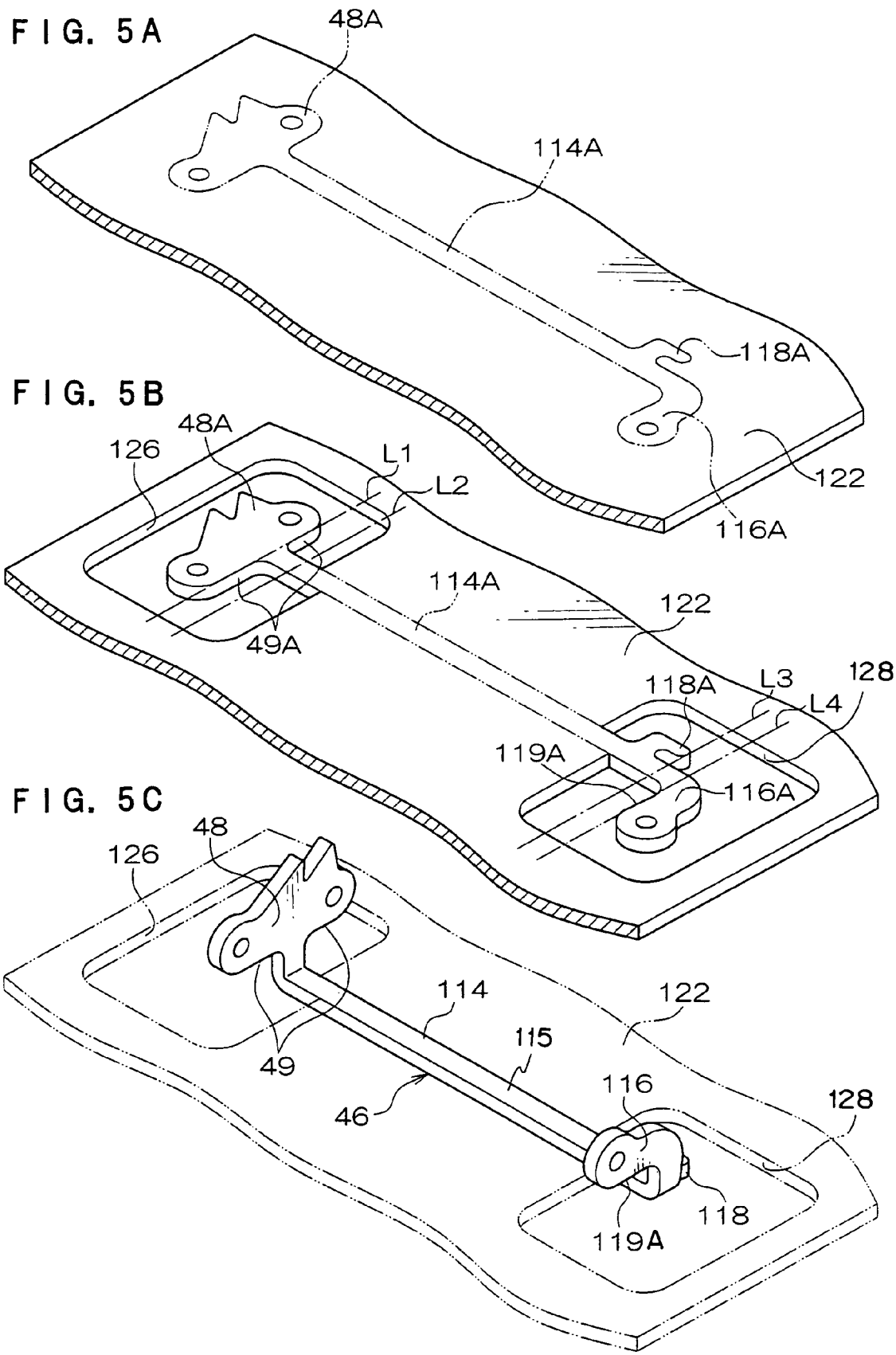

WEBBING TAKE-UP DEVICE

CROSS-REFERENCE TO RELATED APPLICATION

This application claims priority under 35 U.S.C. 119 from Japanese Patent Application No. 2005-44384, the disclosure of which is incorporated by reference herein.

BACKGROUND OF THE INVENTION

1. Field of the Invention

The present invention relates to a webbing take-up device, and more specifically to a webbing take-up device provided with a lock mechanism that is designed to, when certain conditions such as a sudden vehicle deceleration are fulfilled, block rotation in the direction in which webbing is pulled out of a take-up shaft having a webbing belt wound in layers thereon for restraining a vehicle occupant.

2. Description of the Related Art

There are webbing take-up devices that are made to be attached to a vehicle. These are equipped with lock mechanisms that block rotation of a take-up shaft, on which a webbing belt is wound in layers, in the direction in which the webbing is pulled out when the vehicle is experiencing an emergency. An example of such a device is disclosed in Japanese Patent Publication No. 10-500648. The lock mechanism has, for example, a lock gear that rotates coaxially with a take-up shaft and which has ratchet teeth formed on the outer periphery thereof. Further, the lock mechanism also has a lock plate that corresponds to the lock gear and which can engage the ratchet teeth of the lock gear. There are also other devices in which the lock mechanism is not provided with a lock gear, rather, the mechanism is designed with a lock plate to be able to directly engage the take-up shaft.

A webbing take-up device provided with such lock mechanisms has an acceleration sensor that detects when the vehicle is in a state of sudden deceleration. The acceleration sensor detects the rate of acceleration (deceleration) of the vehicle and when the deceleration exceeds a certain amount, it operates the lock mechanism. When it has been detected with the acceleration sensor that the rate of deceleration of the vehicle has exceeded the certain amount, the lock mechanism operates and the lock plate latches the take-up shaft either directly or indirectly (via the lock gear). The lock plate stops the rotational force (i.e., load) of the take-up shaft in the direction in which the webbing is pulled out. Thus, the device is configured to block rotation of the take-up shaft in the direction in which the webbing is pulled out.

The lock plate of such a webbing take-up device is usually manufactured with a process that uses, for example, die casts. It is preferable that the lock plate of the webbing take-up device be made as strong as possible in order to be able to stop the rotational force of the take-up shaft turning in the webbing pullout direction.

Nonetheless, with die cast parts, the parts need to be made larger and heavier in order to obtain strength that is equal to that of parts that are press formed. For this reason, there has been a need to increase the strength of the lock plate (i.e., the strength that stops the rotational force of the take-up reel rotating in the webbing pullout direction) without increasing the size or weight of the lock plate.

SUMMARY OF THE INVENTION

The present invention was made in light of the above-described circumstances, and has achieved a webbing take-up device that can block rotation of the take-up shaft in the webbing pullout direction while the required strength of the lock plate is ensured without increasing the size or weight of the parts.

The first embodiment of the present invention provides a webbing take-up device comprising: a take-up shaft that takes up a webbing belt for restraining a vehicle passenger; a metal frame that axially supports the take-up shaft at both ends of the take-up shaft; and a lock mechanism comprising a lock plate that blocks rotation in the pullout direction of the webbing of the take-up shaft by engaging the take-up shaft directly or indirectly. The lock plate is formed by performing press-punch processing and press-bend processing on a metal plate and has a lock that engages the take-up axis at one end thereof, a connecting portion that spans between the one end side and the other end side of the frame and the connecting portion is formed so that the one end side thereof is continuous with the lock and supports the lock. The lock is formed to be larger along a widthwise direction than the measurement of the connecting portion in the widthwise direction that is the direction perpendicular to both the spanning direction and the thickness direction of the connecting portion, and the surface in the thickness direction of the connecting portion and the cut surfaces of the lock surface on the side of the connecting portion are made to be substantially parallel.

The second embodiment of the present invention provides a webbing take-up device comprising: a take-up shaft that takes up a webbing belt for restraining a vehicle passenger; a metal frame that axially supports the take-up shaft at both ends of the take-up shaft; and a lock mechanism comprising a lock plate that blocks rotation in the pullout direction of the webbing of the take-up shaft by engaging the take-up shaft directly or indirectly, a torsion shaft that rotates as one with the take-up shaft and which can deform when a twisting load exceeding a preset load is applied thereto, and a lock gear latched to the torsion shaft. The lock plate is formed by press-punch and press-bend processing of a metal plate and has: a lock that engages the take-up axis at one end thereof; a connecting portion that spans between the one end side and the other end side of the frame, the connecting portion being formed so that the one end side thereof is continuous with the lock and supports the lock; a temporary retaining unit that is formed facing the frame and continuous with the connecting portion, and which comes into contact with the frame in the spanning direction of the connecting portion and prevents the lock plate from slipping from the frame; and a lock arm formed in the vicinity of the temporary retaining unit and continuous with the connecting portion and having a shaft holder. The lock is formed to be larger along a widthwise direction that is the direction perpendicular to the spanning direction and the thickness direction of the connecting portion than the measurement of the connecting portion along the widthwise direction. The surface in the thickness direction of the connecting portion and the cut surfaces of the lock surface on the side of the connecting portion are made to be substantially parallel. The lock is axially supported by an axial support component attached to the frame to be turnable inside a notch formed in the frame, and the lock plate is axially supported to be turnable, and when the lock plate turns, the lock comes into contact with an edge portion of the cutout. The torsion shaft further comprises a biasing mechanism that biases the take-up shaft and the lock gear in the direction for taking up the webbing belt, and the shaft holder of the lock arm is rotatably supported inside another cutout formed in the frame by a support shaft provided on the biasing mechanism.

Other aspects, features, and advantages of the present invention will become apparent from the following descriptions taken in conjunction with the accompanying drawings.

BRIEF DESCRIPTION OF THE DRAWINGS

Preferred embodiments of the present invention will be described in detail based on the following figures, in which:

FIG. 5A is a diagram of when the lock plate is manufactured showing the first step in press-punch processing and press-bend processing;

FIG. 5B is a diagram of when the lock plate is manufactured showing the middle step in press-punch processing and press-bend processing; and FIG. 5C is a diagram of when the lock plate is manufactured showing the last step in press-punch processing and press-bend processing.

DETAILED DESCRIPTION OF THE INVENTION

Figure 1:
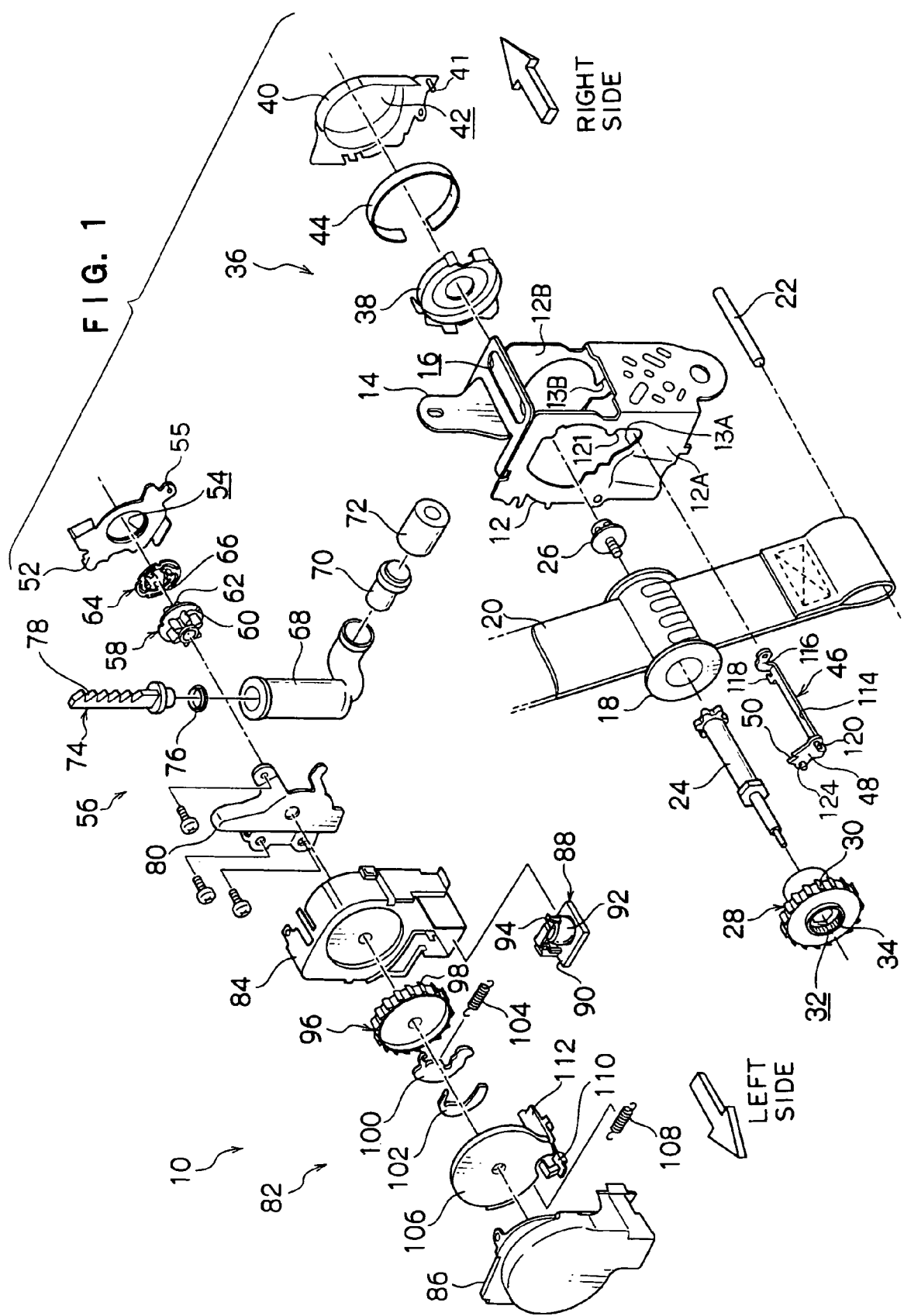
FIG. 1 is an exploded perspective drawing showing the webbing take-up device according to an embodiment of the present invention as seen from one side from above.

An exploded perspective drawing showing the primary portions of the webbing take-up device 10 of an embodiment of the present invention as seen from one side from above is shown in FIG. 1. It should be noted that for the sake of ease of explanation in FIGS. 1 and 2, the arrows indicate "the left side" and the "the right side", as referred to in the description below.

The webbing take-up device 10 of the present embodiment is provided with a metal frame 12 that has a lateral U shape as viewed from above, and the frame 12 is fixed to the interior of a vehicle. A cutout 13A is formed in a left side wall 12A of the frame 12 for the arrangement of a lock 48 of a lock plate 46 (to be described later) that can turn in the interior of the cutout 13A. A cutout 13B is formed in the right side wall 12B of the frame 12 for the arrangement of a shaft holder 116 of the lock plate 46 (to be described later) that can turn in the interior of the cutout 13B. A connecting piece 14 spans between the upper ends of the left side wall 12A and the right side wall 12B of the frame 12, and the connecting piece 14 is fixed to the interior of the vehicle. Further, an insertion hole 16 is formed in the connecting piece 14.

A spool 18 functioning as a take-up shaft is rotatably supported between the left side wall 12A and the right side wall 12B of the frame 12. An elongated belt-like webbing belt 20 for restraining a passenger is reeled up on the spool 18, and a cylindrical shaft 22 set at the base end of the webbing belt 20 is latched to the spool 18 while the base end vicinity is inserted through the spool 18 and latched to the spool 18. Further, the webbing belt 20 is inserted through the insertion hole 16 in the vicinity of the portion taken up on the spool 18, and the webbing belt 20 is worn by the passenger of the vehicle. Also, the webbing belt 20 is reeled up by rotation of the spool 18 in the take-up direction or pulled out by rotation in the pullout direction (i.e., in the direction where the webbing is pulled out).

A torsion shaft 24 constituting a locking mechanism is arranged at the central shaft portion of the spool 18. The torsion shaft 24 is made to be able to deform in a twisted manner by the application of twisted load exceeding a preset load. The end of the right side of the torsion shaft 24 is latched to the end of the right side of the spool 18, and the torsion shaft 24 rotates as one with the spool 18. A screw component 26 is also screwed into the right end of the torsion shaft 24.

A lock gear 28 constituting the locking mechanism with the torsion shaft 24 is provided at one side of the spool 18. The lock gear 28 is latched to the vicinity of one end of the torsion shaft 24. The lock gear 28 rotates as one with the torsion shaft 24 and the spool 18 with the exception of times where the torsion shaft 24 deforms in a twisted manner. Ratchet teeth 30 are formed at the outer periphery of the lock gear 28. Further, a substantially cylindrical knurl hole 32 is formed in the center of the lock gear 28. The knurl hole 32 opens to one side, and a knurl surface 34 is formed by performing knurling on the entire circumference of the surface of the knurl hole 32.

A biasing mechanism 36 is set at the other side of the frame 12. The biasing mechanism 36 has a spring seat 38, which is attached to the exterior side of the right side wall 12B of the frame 12. The spring seat 38 is in a state where it covers the other side surface of the spool 18 while allowing the screw component 26 to protrude towards the other side. The other side of the spring seat 38 is covered by a spring cover 40, which acts as an axial support component and is attached to the outer side of the right side wall 12B of the frame 12. A substantially cylindrical depression 42 is formed in the spring cover 40, and the depression 42 is open to one side.

A helical spring 44 is provided inside the depression 42 of the spring cover 40 and the outer side end of the helical spring 44 is fixed to the inner peripheral surface of the depression 42. The inner side end of the helical spring 44 is fixed to the screw component 26. The helical spring 44 biases the torsion shaft 24, the spool 18, and the lock gear 28 in the take-up direction via the screw component 26.

Further, a substantially cylindrical support shaft 41 is formed at the lower portion of the spring cover 40 and this support shaft 41 protrudes towards one side. The support shaft 41 is accommodated in the lock plate 46.

The lock plate 46 constituting the locking mechanism with the torsion shaft 24 and the lock gear 28. This lock plate 46 is arranged to span between the left side wall 12A and the right side wall 12B of the frame 12. The lock plate 46 is formed by performing press-punching and press-bending on a metal plate 122 that will be described later (see FIG. 5).

Figure 2:
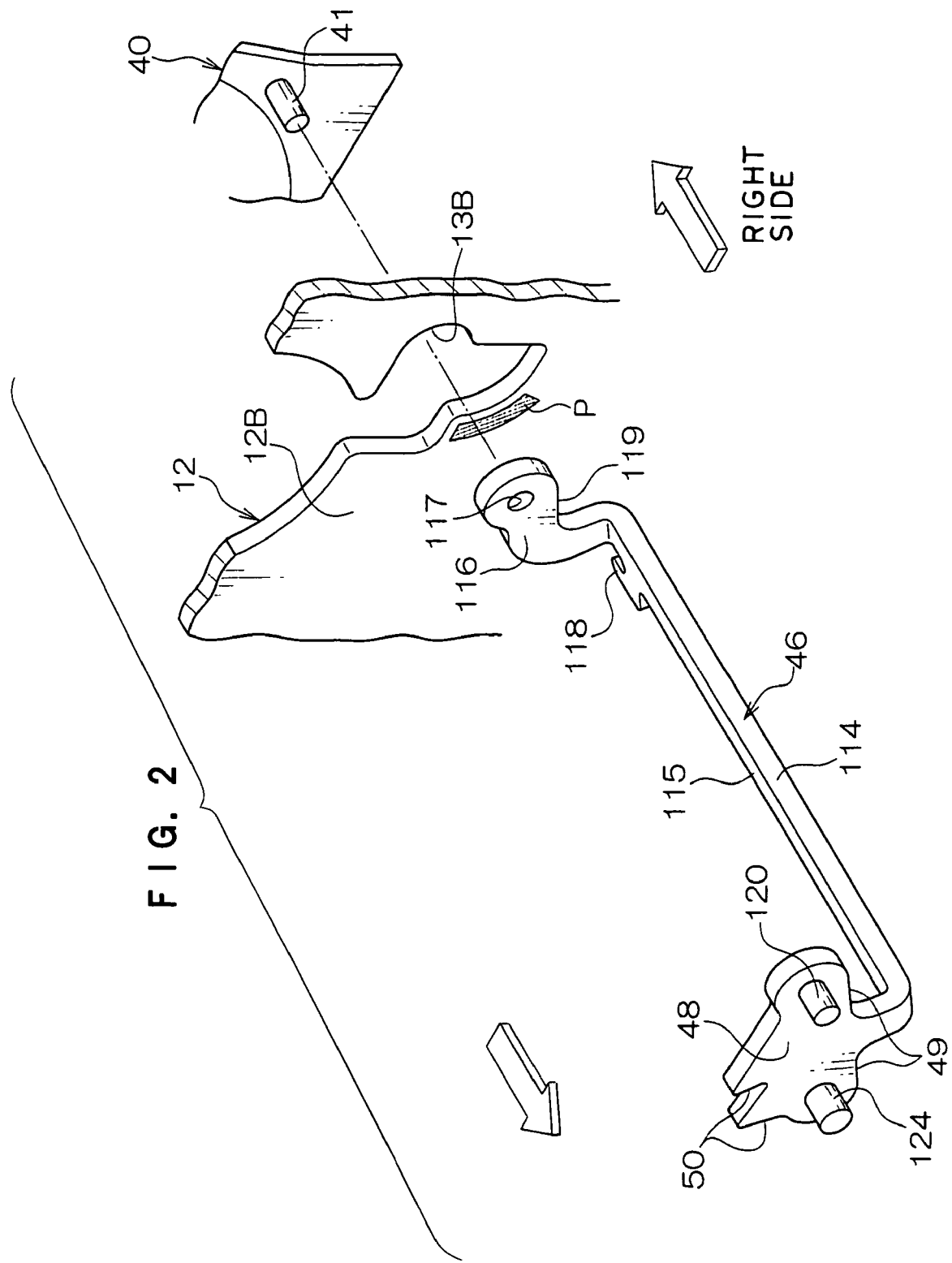
FIG. 2 is an exploded perspective drawing corresponding to FIG. 1, showing the vicinity of the right side wall of the frame.

As shown in FIG. 2, the lock plate 46 is provided with a shaft holder 116 that is accommodated in the cutout 13B of the frame 12. The shaft holder 116 is a sheet member formed into an approximately L-shaped and a shaft hole 117 is formed at one end of the shaft holder 116 through the thickness direction thereof. The support shaft 41 of the spring cover 40 is inserted through the shaft hole 117 of the shaft holder 116. The lock plate 46 is axially supported by the support shaft 41 so as to be turnable and the shaft holder 116 is designed to be turnable within the cutout 13B. Further, a cut surface 119 is formed on one of the surfaces of the axis holder 116 that is on the same side as the connecting portion 114 via press-processing (i.e., press-punching and press-bending processing) of the metal plate 122 (see FIG. 5). The cut surface 119 is parallel to a surface 115 that is one side surface in the thickness direction of the connecting portion 114.

The connecting portion 114 is formed to continue at the other end of the shaft holder 116 (i.e., the end opposite to the shaft hole 117). The connecting portion 114 is a sheet member that spans the lock plate 46 in the longitudinal direction. The shaft holder 116 is provided so as to stand such that its thickness direction is at a right angle relative to the thickness direction of the connecting portion 114.

A temporary retaining unit 118 is formed continuous to the connecting portion 114 in the vicinity of the shaft holder 116. The temporary retaining unit 118 is a sheet member whose thickness direction is the same direction as the thickness direction of the connecting portion 114. The temporary retaining unit 118 extends out somewhat in the widthwise direction, the direction perpendicular to the longitudinal direction and to the sheet thickness direction, of the connecting portion 114 (in other words, the other side in the widthwise direction to the connecting portion 114) and then further bends towards the right side wall 12B side to form an approximate L shape.

The tip portion of the temporary retaining unit 118 extends in the spanning direction of the lock plate 46 upto the proximity of the plane of the surface of the shaft holder 116 on the connecting portion 114 side (i.e., in the vicinity of the surface of one side). The tip portion of the temporary retaining unit 118 is designed to be positioned in the proximity of the inner side of the right side wall 12B when the shaft holder 116 is in a state where it is arranged inside the cutout 13B. This tip portion of the temporary retaining unit 118 faces the inner side of the right side wall 12B in the axial direction of the support shaft 41 and faces a preset position within a P region (i.e., the shaded portion of FIG. 2) of the edge vicinity of the cutout 13B on the inner side of the right side wall 12B, even when the shaft holder 116 of the lock plate 46 turns around the shaft of the support shaft 41 inside the cutout 13B. Accordingly, movement of the lock plate 46 in the axial direction of the support shaft 41 is restricted by the temporary retaining unit 118 coming into contact with the right side wall 12B (at a position within the P region). Further, when the lock plate 46 is pressed to the right side wall 12B along the axial direction of the support shaft 41 (i.e., in the above-described spanning direction), the lock plate 46 is prevented from slipping from the frame 12 due to the tip portion of the temporary retaining unit 118 contacting the right side wall 12B.

Figure 3:
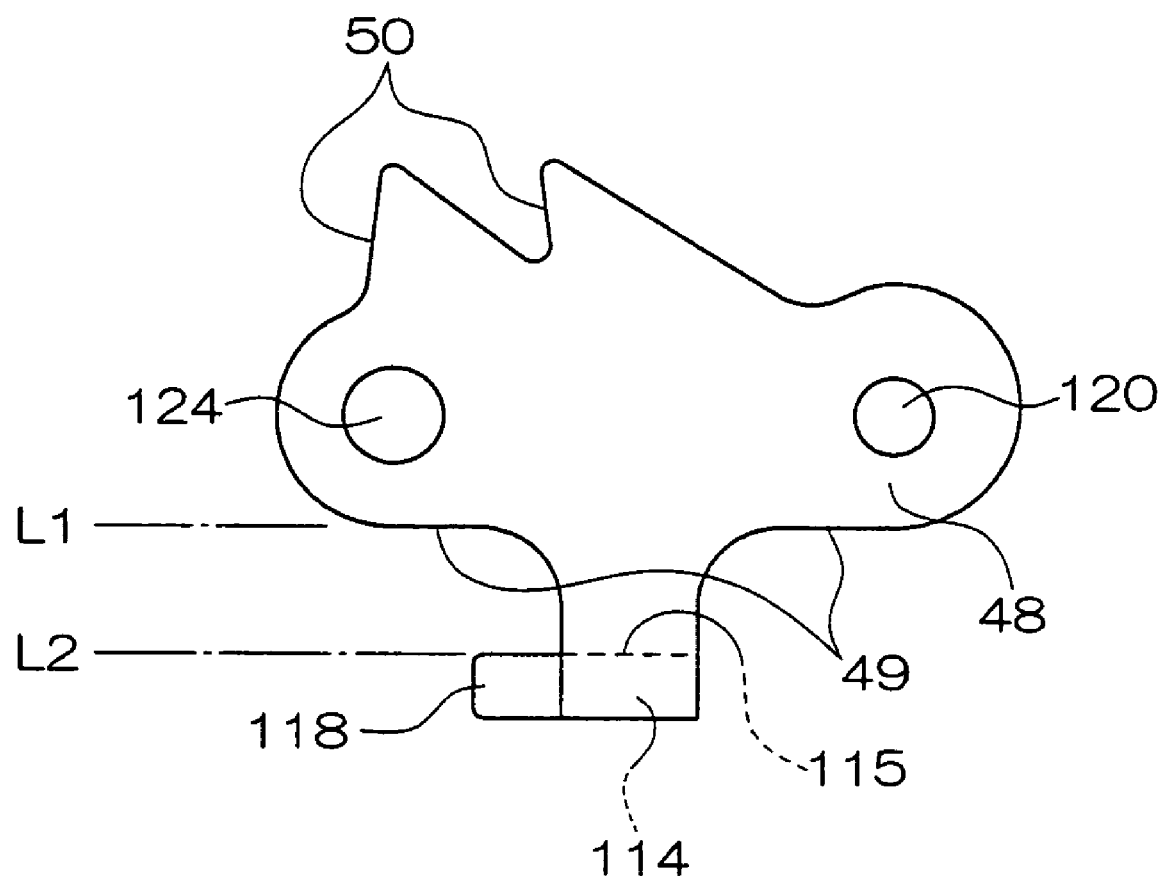
FIG. 3 is a side view drawing showing one side of the lock plate.

The lock 48 is formed continuous to the end of the connecting portion 114 opposite to that of the shaft holder 116 (i.e., the end at the side of the left side wall 12A). This lock 48 is a flat body that is approximately T-shaped. The thickness direction of the lock 48 is perpendicular to the thickness direction of the connecting portion 114, and the lock 48 is provided so as to stand from one side end of the connecting portion 114. As shown in FIG. 3, the lock 48 extends from one side of the connecting portion 114 in a direction in the thickness direction of the connecting portion 114 (i.e., in the direction in which the shaft holder 116 stands). Further, the measurement in the above-mentioned widthwise direction of the tip end of lock 48 is made to be larger than the widthwise direction measurement of the connecting portion 114. The surface of the lock 48 on the connecting portion 114 side has cut surfaces 49 formed thereon via press-processing (i.e., press-punching and press-bending processing) performed on the metal plate 122 (see FIGS. 5A to C). The cut surfaces 49 are actually parallel to the surface 115, which is one side of the connecting portion 114 in the thickness direction (see the dashed lines L1 and L2 in FIG. 3).

Upon referring to FIG. 2, it can be seen that one support shaft 120 is provided united with the lock 48 designed as described above, and this support shaft 120 protrudes towards one side from the lock 48. The support shaft 120 is substantially cylindrical in shape, and provided at one end side of the lock 48 with the axial position thereof the same as the axial position of the shaft hole 117 of the shaft holder 116.

Further, a shaft 124 that protrudes towards one side is provided united with the lock 48. The shaft 124 is also formed to be substantially cylindrical in shape and the axial position of the shaft 124 is parallel to that of the support shaft 120 and shifted in the widthwise direction towards the other end side of the lock 48.

The support shaft 120 of the lock 48 is inserted through a shaft hole 55 (see FIG. 1) formed as a shaft support component at the lower portion of a gear case 52 (to be described hereafter). The lock plate 46 is axially supported by the gear case 52 so as to be turnable and so the lock 48 of the lock plate 46 is turnable inside the cutout 13A. In this state, the lock 48, as shown in FIG. 1, is arranged in a direction diagonally below the lock gear 28. Lock teeth 50 are formed at the other side end of the lock 48, arranged opposite the lock gear 28. The lock teeth 50 are arranged in a state where they cannot engage the ratchet teeth 30 of the lock gear 28. When the lock plate 46 turns (for example turns in the pullout direction), if the lock teeth 50 of the lock 48 engage the ratchet teeth 30 of the lock gear 28, then the lock 48 comes into contact with an edge portion 121 of the cutout 13A of the left side wall 12A.

As shown in FIG. 1, the gear case 52 is attached to the exterior side of the left side wall 12A of the frame 12, and the gear case 52 covers the lock gear 28 at one side. A circular through-hole 54 is formed in the center of the gear case 52 and this through-hole 54 exposes the knurl hole 32 of the lock gear 28 and is inserted by the torsion shaft 24.

Figure 4:
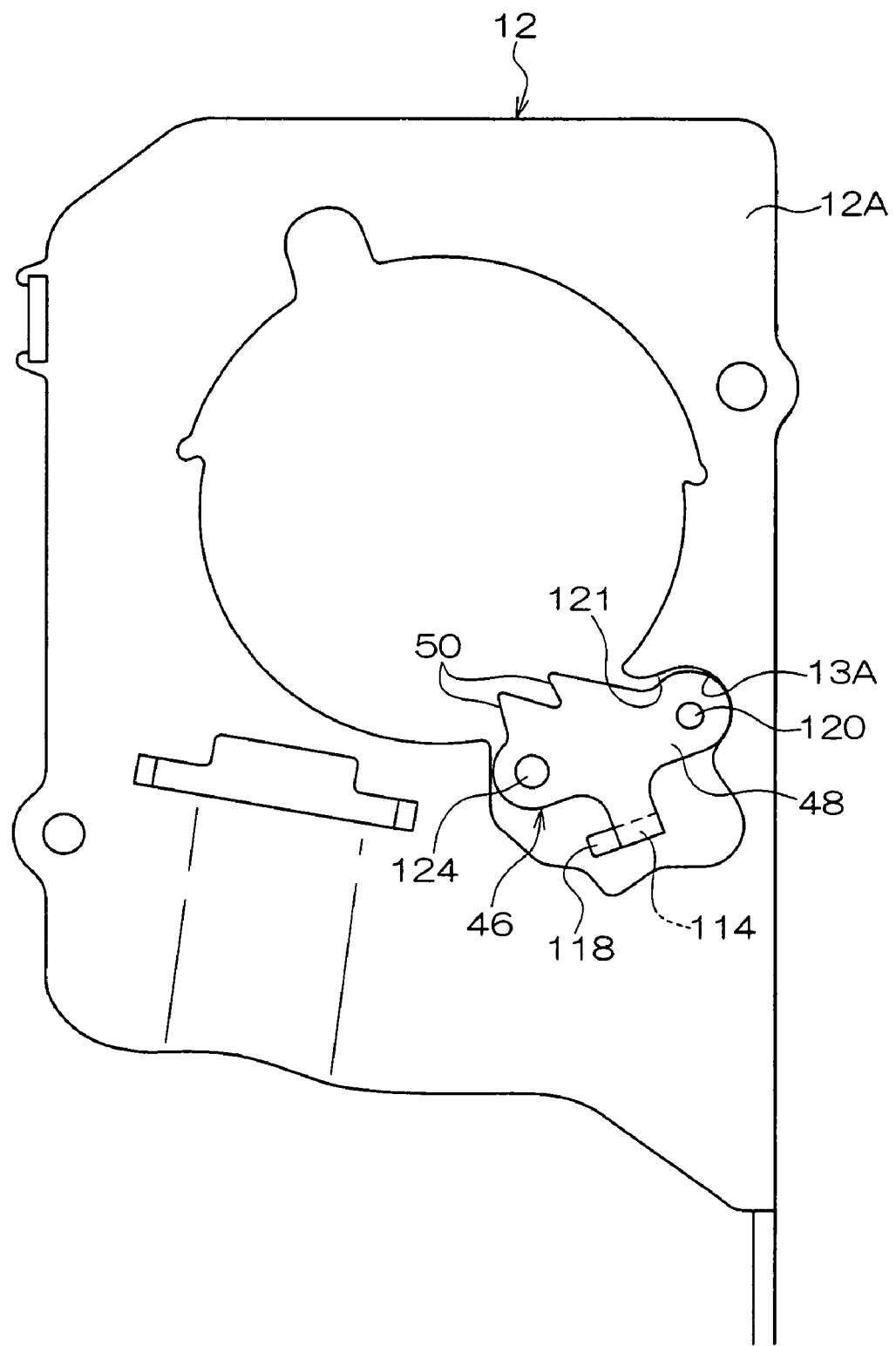
FIG. 4 is a side view drawing of the lock mechanism when in operation showing the position relations of the lock plate and the frame from the left side.

The circular shaft hole 55 is also formed diagonally below the through-hole 54 and has a smaller diameter than the through-hole 54. The shaft hole 55 accommodates the support shaft 120 of the lock plate 46 and the support shaft 120 of the lock plate 46 is inserted through the shaft hole 55. Due to this, the gear case 52 axially supports the lock plate 46 so as to be turnable as described above, and the lock 48 of the lock plate 46 can turn inside the cutout 13A of the frame 12 (see FIGS. 1 and 4). In this manner, the gear case 52 moves with the spring cover 40 and axially supports the lock plate 46 turnably, and the connecting portion 114 of the lock plate 46 spans across the left side wall 12A and the right side wall 12B of the frame 12.

A pretensioner mechanism 56 is set at the outer side of left side wall 12A of the frame 12. The pretensioner mechanism 56 has a pinion 58 that is arranged at one side of the gear case 52 and is supported so as to be rotatable with the torsion shaft 24. Pinion teeth 60 are formed on a portion of one side of the pinion 58. Also, a cam 62 is formed on a portion of the other side of the pinion 58 and protrusions and depressions are alternately formed at the outer periphery of the cam 62. The cam 62 is inserted into the knurl hole 32 via the through-hole 54 of the gear case 52 but remains out of contact with the knurl surface 34, and the lock gear 28 is configured to be independently rotatable of the pinion 58.

The pretensioner mechanism 56 has a clutch plate 64 that is arranged between the gear case 52 and the pinion 58. Multiple engagement claws 66 are formed on the center side of the clutch plate 64, and each engagement claw 66 protrudes from the clutch plate 64 towards the right side. Each engagement claw 66 matches with each indented portion of the cam 62 and due to this, the clutch plate 64 is attached to the pinion 58. Each engagement claw 66 is inserted into the interior of the knurl hole 32 with the cam 62, via the through-hole 54 of the gear case 52, while remaining out of contact with the knurl surface 34, and the lock gear 28 is configured to be independently rotatable of the clutch plate 64.

The pretensioner mechanism 56 has an approximately L-shaped columnar cylinder 68. The cylinder 68 is fixed to the outer side of left side wall 12A of the frame 12 beneath the pinion 58. A gas generator 70 is provided at the lower side end of the cylinder 68 and a cylindrical generator cap 72 having a bottom is fixed thereto. The gas generator 70, with the generator cap 72 covering it, closes off the lower side end of the cylinder 68.

The pretensioner mechanism 56 has a piston 74 that is inserted into the interior of the cylinder 68 from the upper end thereof. An O-ring 76 is provided at the lower end of the piston 74. The O-ring 76 forms a seal between the lower end of the piston 74 and the cylinder 68. Further, a rack 78 is formed on the piston 74 except for at a position at the lower end.

The pretensioner mechanism 56 has a cover plate 80 that is an approximately triangular-shaped container and which is fixed to the outer side of the left side wall 12A of the frame 12. The torsion shaft 24 is inserted through the cover plate 80 at the lower portion thereof, whereby the torsion shaft 24 is rotatably supported. The cover plate 80 is open at the right side surface and the lower surface and accommodates the pinion 58, the clutch plate 64, and the upper portion of the piston 74 in its interior, while clasping and retaining the gear case 52 between itself and the left side wall 12A of the frame 12.

A sensor mechanism 82, which constitutes a locking mechanism with the torsion shaft 24, the lock gear 28, and the lock plate 46, is provided at one side of the pretensioner mechanism 56. The sensor mechanism 82 has a box-shaped sensor holder 84 that is open to the right side and is fixed to the left side wall 12A of the frame 12 in a state where the torsion shaft 24 is inserted through the upper portion of the sensor holder 84. The left side of the sensor holder 84 is covered by a box-shaped sensor cover 86 that is open to the right side, and the sensor cover 86 is fixed to the sensor holder 84 and the left side wall 12A of the frame 12.

An acceleration sensor 88 is retained at the lower portion of the sensor holder 84 and is arranged within the space between the sensor holder 84 and the sensor cover 86. The acceleration sensor 88 has a mounting unit 90. A substantially circular depression is formed on the upper surface of the mounting unit 90 and a spherical body 92 is mounted in the depression of the mounting unit 90. A movable claw 94 is turnably supported above the spherical body 92 and the movable claw 94 is mounted on the spherical body 92.

A V-gear 96 is provided in the space between the sensor holder 84 and the sensor cover 86. The V-gear 96 is latched to one end side of the torsion shaft 24 and rotates as one with the torsion shaft 24. Further, ratchet teeth 98 are formed on the outer periphery of the V-gear 96.

A W-pawl 100 is supported at the V-gear 96 so as to be turnable and a mass 102 is fixed to the W-pawl 100. A sensor spring 104 spans between the V-gear 96 and the W-pawl 100 and the sensor spring 104 biases the V-gear 96 in the take-up direction relative to the W-pawl 100.

A substantially circular disc-shaped gear sensor 106 is provided in the space between the sensor holder 84 and the sensor cover 86 at the left side of the V-gear 96. The gear sensor 106 is rotatably supported by the rim of the torsion shaft 24 at the left hand end. A coil spring 108 spans between the inner surfaces of the sensor cover 86 at the gear sensor 106, and the coil spring 108 biases the gear sensor 106 in the take-up direction.

An engagement claw 110 is turnably supported at the lower portion of the gear sensor 106 at the left side, and it is configured such that the center axis of rotation is parallel with the axial direction of the torsion shaft 24 and the engagement claw 110 is able to engage the ratchet teeth 98 of the V-gear 96. Furthermore, the gear sensor 106 is configured so that a pressing piece 112 is formed at the lower portion thereof at the right side.

Next, the operation of the present embodiment will be explained.

With the webbing take-up device 10 configured as described above, the helical spring 44 of the biasing mechanism 36 biases the torsion shaft 24, the spool 18, and the lock gear 28 in the wind-up direction via the screw component 26, whereby the webbing belt 20 is biased in the take-up direction upon the spool 18.

The acceleration sensor 88 of the sensor mechanism 82 detects when the vehicle's acceleration (i.e., the movement acceleration of the spool 18) exceeds a preset speed of acceleration. That is, when the acceleration of the vehicle is over a preset acceleration (e.g., at the time of rapid deceleration) the spherical body 92 of the acceleration sensor 88 moves towards the side of the depression of the mounting unit 90 opposite to the acceleration direction, rises, and presses the movable claw 94 upwards. Due to this, the movable claw 94 rotates the engagement claw 110 of the gear sensor 106 and makes it engage with the ratchet teeth 98 of the V-gear 96, whereby the gear sensor 106 enters a state of connection with the V-gear 96.

The W-pawl 100 of the sensor mechanism 82, the mass 102, and the sensor spring 104 detect when the pullout acceleration of the webbing belt 20 (i.e., the rotational acceleration in the pullout direction of the spool 18) is higher than a specific acceleration. That is, when the pullout acceleration of the webbing belt 20 is higher than a specific acceleration, the rotation of the W-pawl 100 and the mass 102 relative to that of the V-gear 96, rotated in the pullout direction via the spool 18 and the torsion shaft 24, is suppress due to inertia whereby the W-pawl 100 and the mass 102 turn relative to the V-gear 96. Due to this, the W-pawl 100 makes the engagement claw 110 of the gear sensor 106 rotate and engage with the ratchet teeth 98 of the V-gear 96, whereby the gear sensor 106 enters a state of interlocking with the V-gear 96.

When the gear sensor 106 has entered a state of interlocking with the V-gear 96, the pullout load from the passenger applied to the webbing belt 20 through the spool 18 and torsion shaft 24 makes the V-gear 96 and gear sensor 106 rotate somewhat in the pullout direction. It should be noted that in this case, the rotational force of the V-gear 96 and the gear sensor 106 reduces due to the biasing force of the sensor spring 104 being increased by the inertia of the W-pawl 100 and the mass 102.

The pressing piece 112 of the gear sensor 106 turns the lock 48 of the lock plate 46 towards the side of the lock gear 28 due to the gear sensor 106 rotating somewhat in the pullout direction. Due to this, pullout load to the webbing belt 20 from the passenger and rotational force of the spool 18, the torsion shaft 24, and the lock gear 28 in the pullout direction is imparted to the lock 48, whereby the lock teeth 50 of the lock 48 engage the ratchet teeth 30 of the lock gear 28 and rotation of the lock gear 28 in the pullout direction is blocked, whereby pulling out of the webbing belt 20 is blocked.

In this case, the lock 48 comes into contact with the edge portion 121 of the cutout 13A of the frame 12. Due to this, the load generated in the pullout direction of the spool 18 (i.e., the rotational force in the pullout direction) is taken by the left side wall 12A of the frame 12 via the torsion shaft 24, the lock gear 28, and the lock 48. Here, since the frame 12 is made of metal, the lock 48 that received the load can be sufficiently supported by the frame 12 even without a special component (i.e., a reinforcing component) for taking this load being separately provided.

Further, since a special component for stopping the load generated in the pullout direction of the spool 18 is unnecessary, the number of parts in the device can be reduced.

Moreover, when assembling the webbing take-up device 10 as explained above, the lock plate 46 is moved along the spanning direction (i.e., the axial direction of the support shaft 41 of the spring cover 40). By inserting the support shaft 41 of the spring cover 40, which is attached to the outer side of the right side wall 12B of the frame 12, through the shaft hole 117 of the lock plate 46, the lock plate 46 is assembled to the frame 12. Here, the temporary retaining unit 118 of the lock plate 46 faces the right side wall 12B of the frame 12, after which the temporary retaining unit 118 comes into contact with the right side wall 12B of the frame 12 (i.e., is in contact with a preset position within the P region). For this reason, fall out of the lock plate 46 from the frame 12 can be prevented.

Further, with the present webbing take-up device 10, if for some reason the lock plate 46 tries to move in its spanning direction towards the right side wall 12B side, the temporary retaining unit 118 of the lock plate 46 is in contact with the right side wall 12B of the frame 12 in that spanning direction (i.e., is in contact with a preset position within the P region). As a result, a lock plate 46 that attempts to move in the direction it spans towards the right side wall 12B of the frame 12 is stopped by the right side wall 12B. Here, the frame 12 is made from metal so a special component (e.g., reinforcing component) for receiving the lock plate 46 trying to move in the spanning direction towards the right side wall 12B side is not necessary. Also, such an attempt by the lock plate 46 to move can be sufficiently resisted without increasing the strength of the spring cover 40 that axially supports the lock plate 46 at the right side wall 12B side (even when using a spring cover 40 that is not so strong, for example, a spring cover 40 that is made from a resin material).

Further, since the present webbing take-up device 10 can be made without a special component for stopping the lock plate 46 from moving in its spanning direction towards the right side wall 12B, the number of parts for the present device can be reduced in comparison with conventional webbing take-up devices that require such a special component.

As explained above, with the lock plate 46 of the present webbing take-up device 10, it is completely unnecessary to provide, for example, a pair of locking units that latch to either the spool 18 or lock gears 28 at both end portions in the longitudinal directions of the connecting portion 114. Sufficient strength (i.e., strength to block rotation of the spool 18 in the take-up direction) can be obtained with the lock 48 at one side only.

It should be mentioned that when manufacturing the lock plate 46 of the webbing take-up device 10 as explained above, first press-processing is performed on the metal plate 122 (see FIG. 5A) and then the substantially cylindrical support shaft 120 and shaft 124 (omitted from FIGS. 5A to C, refer to FIGS. 1 and 4) are formed so as to protrude at one side in the thickness direction (in FIG. 5A, the downward direction). Here, the processing for forming of the protruding support shaft 120 and the shaft 124 is included within the definition of the broad term of "press-punch processing".

Next, cutouts 126, 128 are formed in the metal plate 122 by performing press-punch processing on the metal plate 122. Here, a lock 48A is formed with the cutout 126 while a shaft holder 116A and temporary retaining unit 118A are formed with the cutout 128. Then a connecting portion 114A is formed by both these cutouts 126 and 128 (see FIG. 5B).

With the metal plate 122 in which the cutouts 126, 128 are formed, the lock 48A is formed in the same shape as the lock 48, the connecting portion 114A is formed in the same shape as the 114, and the temporary retaining unit 118A is formed in the same shape as the 118. The connecting portion 114A is formed continuous with both the lock 48A and the shaft holder 116A, however, the above-described connecting portion 114 (see FIG. 2) is formed in the same shape with unwanted portions of the metal plate 122 (i.e., parts to be cut away) attached at the center portion in the longitudinal direction (i.e., spanning direction) of both sides in the widthwise direction.

The metal plate 122 in which the cut outs 126, 128 are formed has cut surfaces 49A of the lock 48A, which are made to be the cut surfaces 49 and the lock 48, formed along the widthwise direction, which is a direction perpendicular to both the thickness direction and the longitudinal direction (here, this refers to the direction that directly connects the lock 48A and the shaft holder 116A). Also, a cut surface 119A of the shaft holder 116A, which is made into the cut surface 119 of the shaft holder 116, is formed along the above widthwise direction.

Next, press-bending processing is performed on the metal plate 122 in which the cutouts 126, 128 were formed. The metal plate 122 is press-bent processed such that the bending line of the boundary of the lock 48A with the connecting portion 114A that are press-bending processed (i.e., the portion on the dotted line L2 in the metal plate 122) is parallel to the cut surfaces 49A of the lock 48A (i.e., so as to be parallel with the dotted line L1 that is in the widthwise direction in the plane of the cut surfaces 49A). Also, the metal plate 122 is press-bent processed such that the bending line of the boundary of the connecting portion 114A with the shaft holder 116A that are press-bending processed (i.e., the portion on the dotted line L3 in the metal plate 122) is parallel to the cut surface 119A of the shaft holder 116A (i.e., so as to be parallel with the dotted line L4 that is in the widthwise direction in the plane of the cut surface 119A). Due to this, as shown in FIG. 5C, the lock 48A (corresponding to the lock 48) can be made to stand at the correct angle (here, the angle formed is 90°) relative to the connecting portion 114A (corresponding to the connecting portion 114 excluding the above-described parts of the metal plate 122 to be cut away). Also, the shaft holder 116A (which corresponds to the shaft holder 116) can be made to stand at the appropriate angle (here, the angle formed is 90°) relative to the connecting portion 114A.

Next, the metal plate 122 is press-punched processed so that the shape of the connecting portion 114A is the same of the connecting portion 114 of the lock plate 46, and the connecting portion 114 is formed by cutting off the unwanted portions of the connecting portion 114A and the lock plate 46 is completed.

In this manner, with this manufacturing method, the lock plate 46 can be manufactured by press-punch processing and press-bend processing the metal plate 122 without using a die cast. For this reason, rotation of the spool 18 in the pullout direction can be blocked with the lock plate 46 of the present webbing take-up device 10 without increasing the size of the lock plate 46.

It should be noted that in the present embodiment, the lock plate 46 was configured such that the support shaft 120 was provided at the lock 48, however, the lock plate 46 is not thus limited. For example, can be configured such that a substantially cylindrical support shaft protruding to the left direction and diagonally below the through-hole 54 can be formed in place of forming the shaft hole 55 at the gear case 52. Such a support shaft can be passed through the thickness direction of the lock 48, whereby the lock plate 46 is axially turnably supported by this support shaft, and the lock 48 is turnable inside the cutout 13A of the left side wall 12A. In this case, the support shaft diagonally below the through-hole 54 can be formed by a process such as insert molding.

Further, the webbing take-up device 10 of the present embodiment was configured where the lock 48 of the lock plate 46 was latched (indirectly) to the spool 18 via the lock gear 28 and the torsion shaft 24, however, the present invention is not thus limited. The webbing take-up device 10 can be configured such that the lock 48 is directly latched to a spool having an integrally formed lock gear.

What is claimed is:

1. A webbing take-up device comprising:
    a take-up shaft that takes up a webbing belt for restraining a vehicle passenger;
    a metal frame that axially supports the take-up shaft at both ends of the take-up shaft and which has a pair of opposing sides; and
    a lock mechanism comprising a lock plate that blocks rotation in the pullout direction of the webbing of the take-up shaft, said lock mechanism engaging the take-up shaft; wherein
    the lock plate is formed by performing press-punch processing and press-bend processing on a same metal plate and has
    a lock having teeth on a first surface latching with a lock gear so as to block rotation in the pullout direction of the take-up shaft;
    a connecting portion that spans between the opposing sides of the frame and being formed so that one end side thereof includes a right angle bend that is continuous with a second surface of the lock that is opposite to said first surface of the lock and that supports the lock; and
    the lock is formed to be larger along a widthwise direction than the measurement of the connecting portion in the widthwise direction that is the direction perpendicular to both the spanning direction and the thickness direction of the connecting portion,
    wherein a surface of the connecting portion perpendicular to in the thickness direction and cut surfaces of the second lock surface closest to the one end side of the connecting portion and on opposite sides of the right angle bend in the widthwise direction are made to be substantially parallel, and said cut surfaces of the second lock surface are coplanar,
    wherein said lock teeth of said lock face away from the connecting portion, and lie spaced away from the ends of the lock in the widthwise direction, and said lock and connecting portion have a same thickness, and wherein said lock includes at least one support shaft attached thereto.

2. The webbing take-up device of claim 1, wherein a cutout is formed in the frame so that the lock can be turnably arranged therein, the lock is axially supported to be turnable inside the cutout by an axial support component attached to the frame, and the lock plate is axially supported to be turnable, and when the lock plate turns, the lock comes into contact with an edge portion of the cutout.

3. The webbing take-up device of claim 2, wherein the lock plate has a temporary retaining unit that is formed facing the frame and continuous with the connecting portion, and comes into contact with the frame in the spanning direction of the connecting portion, and stops the lock plate from falling out from the frame.

4. The webbing take-up device of claim 3, further comprising a lock arm formed in the vicinity of the temporary retaining unit and continuous with the connecting portion, the lock arm having a shaft holder.

5. The webbing take-up device of claim 4, wherein the lock mechanism can deform by the application of a twisting load that exceeds a preset load, and further comprises a torsion shaft made to rotate as one with the take-up shaft.

6. The webbing take-up device of claim 5, wherein the lock gear is latched to the torsion shaft.

7. The webbing take-up device of claim 6, comprising a biasing mechanism that biases the take-up shaft and the lock gear in the direction for taking up the webbing belt.

8. The webbing take-up device of claim 7, wherein the shaft holder of the lock plate is rotatably supported inside another cutout formed in the frame by a support shaft provided on the biasing mechanism.

9. The webbing take-up device of claim 3, wherein the lock mechanism can deform by the application of a twisting load that exceeds a preset load, and further comprises a torsion shaft made to rotate as one with the take-up shaft.

10. The webbing take-up device of claim 9, wherein the lock gear is latched to the torsion shaft.

11. The webbing take-up device of claim 2, wherein the lock mechanism can deform by the application of a twisting load that exceeds a preset load, and further comprises a torsion shaft made to rotate as one with the take-up shaft.

12. The webbing take-up device of claim 11, wherein the lock gear is latched to the torsion shaft.

13. The webbing take-up device of claim 1, wherein the lock plate has a temporary retaining mechanism that is formed facing the frame and continuous with the connecting portion, and comes into contact with the frame in the spanning direction of the connecting portion, and stops the lock plate from slipping from the frame.

14. The webbing take-up device of claim 13, further comprising a lock arm formed in the vicinity of the temporary retaining unit and continuous with the connecting portion, the lock arm having a shaft holder.

15. The webbing take-up device of claim 14, wherein the lock mechanism can deform by the application of a twisting load that exceeds a preset load, and further comprises a torsion shaft made to rotate as one with the take-up shaft.

16. The webbing take-up device of claim 15, wherein the lock gear is latched to the torsion shaft.

17. The webbing take-up device of claim 16, further comprising a biasing mechanism that biases the take-up shaft and the lock gear in the direction for taking up the webbing belt.

18. The webbing take-up device of claim 17, wherein the shaft holder of the lock plate is rotatably supported inside a cutout formed in the frame by a support shaft provided on the biasing mechanism.

19. The webbing take-up device of claim 13, wherein the lock mechanism can deform by the application of a twisting load that exceeds a preset load, and further comprises a torsion shaft made to rotate as one with the take-up shaft.

20. The webbing take-up device of claim 19, wherein the lock gear is latched to the torsion shaft.

21. The webbing take-up device of claim 1, wherein the lock mechanism can deform by the application of a twisting load that exceeds a preset load, and further comprises a torsion shaft made to rotate as one with the take-up shaft.

22. The webbing take-up device of claim 21, wherein the lock gear is latched to the torsion shaft.

23. A webbing take-up device comprising:
    a take-up shaft that takes up a webbing belt for restraining a vehicle passenger;
    a metal frame having opposing sides that axially support the take-up shaft at both ends of the take-up shaft; and
    a lock mechanism comprising a lock plate that blocks rotation in the pullout direction of the webbing of the take-up shaft, said lock mechanism engaging the take-up shaft, a torsion shaft that rotates as one with the take-up shaft and which can deform when a twisting load exceeding a preset load is applied thereto, and a lock gear latched to the torsion shaft, wherein the lock plate is formed by press-punch and press-bend processing of a same metal plate and has a lock having teeth on a first surface latching with a lock gear so as to block rotation in the pullout direction of the take-up shaft;

a connecting portion that spans between the opposing sides of the frame, the connecting portion being formed so that one end side includes a right angle bend that is continuous with a second surface of the lock that is opposite to said first surface of the lock and that supports the lock, a temporary retaining unit that is formed continuous with the connecting portion, and which comes into contact with the frame in the spanning direction of the connecting portion and prevents the lock plate from slipping from the frame, and a lock arm formed in the vicinity of the temporary retaining unit and continuous with the connecting portion and having a shaft holder;

the lock is formed to be larger along a widthwise direction that is the direction perpendicular to the spanning direction and the thickness direction of the connecting portion than the measurement of the connecting portion along the widthwise direction, and wherein a surface of the connecting portion perpendicular to the thickness direction and cut surfaces of the second lock surface closest to the one end side of the connecting portion and on opposite sides of the right angle bend in the widthwise direction are made to be substantially parallel, and said cut surfaces of the second lock surface are coplanar, wherein said lock teeth of said lock face away from the connecting portion, and lie spaced away from the ends of the lock in the widthwise direction, and the lock includes at least one support shaft attached thereto so as to be axially turnable inside a cutout formed in the frame by an axial support component attached to the frame, and the lock plate is axially supported to be turnable, and when the lock plate turns, the lock comes into contact with an edge portion of the cutout;

the torsion shaft being connected to a biasing mechanism that biases the take-up shaft and the lock gear in the direction for taking up the webbing belt; and the shaft holder of the lock arm is rotatably supported inside another cutout formed in the frame by a support shaft provided on the biasing mechanism, and wherein said lock and connecting portion have a same thickness.

* * * * *